(12) United States Patent
Nishimoto et al.

(10) Patent No.: US 10,000,256 B2
(45) Date of Patent: Jun. 19, 2018

(54) BICYCLE SPROCKET

(71) Applicant: Shimano Inc., Sakai, Osaka (JP)

(72) Inventors: Yusuke Nishimoto, Osaka (JP);
Mitsuru Kamiya, Osaka (JP)

(73) Assignee: Shimano Inc., Osaka (JP)

( * ) Notice: Subject to any disclaimer, the term of this patent is extended or adjusted under 35 U.S.C. 154(b) by 791 days.

(21) Appl. No.: 14/446,930

(22) Filed: Jul. 30, 2014

(65) Prior Publication Data
US 2015/0203173 A1 Jul. 23, 2015

Related U.S. Application Data

(60) Provisional application No. 61/930,542, filed on Jan. 23, 2014.

(51) Int. Cl.
B62M 9/02 (2006.01)
B62M 9/00 (2006.01)

(52) U.S. Cl.
CPC .......... B62M 9/02 (2013.01); B62M 2009/007 (2013.01)

(58) Field of Classification Search
CPC .... B62M 9/02; B62M 2009/007; B62M 9/04; B62M 9/00
USPC ................. 474/152, 158, 155, 209–212, 156
See application file for complete search history.

(56) References Cited

U.S. PATENT DOCUMENTS 4,174,642 A 11/1979 Martin et al.
4,879,920 A * 11/1989 Kerkhoff ................. F16H 55/10
74/422
5,848,948 A * 12/1998 Allen ........................ F16H 7/06
474/156
6,036,614 A * 3/2000 Baddaria ................. F16H 55/30
474/155
6,325,734 B1 * 12/2001 Young ....................... F16H 7/06
474/156
6,375,589 B1 * 4/2002 Makino ..................... F16H 7/06
474/148

(Continued)

FOREIGN PATENT DOCUMENTS

CN 1861474 A 11/2006
CN 1915773 A 2/2007

(Continued)

Primary Examiner — William E Dondero
Assistant Examiner — Mark K Buse
(74) Attorney, Agent, or Firm — Global IP Counselors, LLP

(57) ABSTRACT

A sprocket is engageable with a chain having rollers. The sprocket includes a body and a tooth portion. The tooth portion has front and rear surfaces, a drive side surface and a non-drive side surface. The rear and front surfaces face in opposite axial directions. The drive side surface axially connects the front and rear surfaces on a downstream side. The non-drive side surface axially connects the front and rear surfaces on an upstream side. One of the front and rear surfaces has a first chamfered portion, which is formed in a radially outer portion of at least one tooth portion and tapered radially outward in the axial direction. The drive side surface has a first protrusion, which protrudes downstream in the drive rotation direction and is located radially outwardly from a contact position where the drive side surface contacts each of the rollers when the chain is driven.

23 Claims, 10 Drawing Sheets

(56) References Cited

U.S. PATENT DOCUMENTS

| | | | | |
|---|---|---|---|---|
| 6,761,657 B2* | 7/2004 | Young | ............... | F16H 7/06 474/152 |
| 6,958,026 B2* | 10/2005 | Wang | ............... | F16H 55/30 474/148 |
| 7,128,673 B2* | 10/2006 | Kubo | ............... | F16H 55/30 474/152 |
| 7,635,314 B2* | 12/2009 | Kubo | ............... | F16H 7/06 474/152 |
| 7,740,555 B2* | 6/2010 | Markley | ............... | F16H 7/06 474/156 |
| 9,409,624 B2* | 8/2016 | Nishimoto | ............... | B62M 9/105 |
| 2003/0186766 A1* | 10/2003 | Wang | ............... | F16H 55/30 474/152 |
| 2004/0185977 A1* | 9/2004 | Young | ............... | F16H 7/06 474/202 |
| 2005/0009655 A1* | 1/2005 | Kubo | ............... | F16H 55/30 474/152 |
| 2006/0084542 A1* | 4/2006 | Kubo | ............... | B65G 23/06 474/206 |
| 2006/0122018 A1* | 6/2006 | Kubo | ............... | F16H 7/06 474/156 |
| 2006/0135304 A1* | 6/2006 | Sonoda | ............... | F16H 55/08 474/152 |
| 2007/0054768 A1 | 3/2007 | Miyazawa | | |
| 2007/0087880 A1* | 4/2007 | Markley | ............... | F16H 7/06 474/202 |
| 2013/0109519 A1* | 5/2013 | Morita | ............... | F16H 55/30 474/148 |
| 2013/0139642 A1* | 6/2013 | Reiter | ............... | B62M 9/105 74/594.2 |
| 2016/0052596 A1* | 2/2016 | Reiter | ............... | B62M 9/105 474/141 |

FOREIGN PATENT DOCUMENTS

| | | |
|---|---|---|
| EP | 0 269 557 A1 | 6/1988 |
| EP | 0 522 984 A1 | 1/1993 |

* cited by examiner

US 10,000,256 B2

BICYCLE SPROCKET

CROSS-REFERENCE TO RELATED APPLICATIONS

This application claims the benefit of U.S. Provisional Application No. 61/930,542, filed on Jan. 23, 2014. The entire disclosure of U.S. Provisional Application No. 61/930,542 is hereby incorporated herein by reference.

BACKGROUND

Field of the Invention

The present invention generally relates to a sprocket. In particular, the present invention relates to a bicycle sprocket engageable with a chain having rollers.

Background Information

In a bicycle provided with a plurality of rear sprockets, speed change is performed by using a rear derailleur. When a rider on such a bicycle travels on a rough terrain, irregularities on the terrain cause the chain guide of the rear derailleur to vibrate like a pendulum, which changes the tension acting on the chain. It is preferable that a change in the tension acting on the chain is unlikely to result in disengagement of the chain from the front-side sprocket.

US 2013/0139642A1 discloses a sprocket having a plurality of first teeth and the same number of second teeth longer than the first teeth in the direction of the axis of rotation of the sprocket, that is, thicker than the first teeth with the first and second teeth alternately arranged. In this configuration, the first teeth engage with narrow-inner-width inner link plates of the chain, and the second teeth engage with wide-inner-width inner link plates of the chain, resulting in an increased chain holding force, whereby the chain is unlikely to disengage from the sprocket during travel on a rough road. Further, in the sprocket of the related art, a side surface on the upstream side in the direction in which the sprocket is driven and rotated, that is, a non-drive side surface with which the rollers of the chain do not come into contact has a shape that protrudes in the circumferential direction. The shape further increases the chain holding force.

SUMMARY

The sprocket of the related art, which has the first and second teeth having thicknesses different from each other and alternately arranged, provides an increased chain holding force. The idea of different thicknesses is applicable only to a sprocket having an even total number of teeth but is not applicable to a sprocket having an odd total number of teeth.

An object of the invention is provide a bicycle sprocket providing an increased chain holding force (that is, force based on which sprocket holds chain) without alternately differentiating the thickness of tooth portions of the sprocket.

A bicycle sprocket according to an aspect of the invention is engageable with a chain having rollers. The bicycle sprocket includes a body and at least one tooth portion. The body is rotatable around a center rotational axis. The at least one tooth portion is provided along a peripheral portion of the body and has a front surface, a rear surface that faces away from the front surface in an axial direction of the center rotational axis, a drive side surface that connects the front and rear surfaces to each other in the axial direction on a downstream side with respect to a drive rotation direction, and anon-drive side surface that connects the front and rear surfaces to each other in the axial direction on an upstream side with respect to the drive rotation direction.

The at least one tooth portion has a first chamfered portion in a radially outer portion of one of the front surface and the rear surface, and the first chamfered portion is so formed that it is tapered radially outward in the axial direction. The drive side surface has a first protrusion that protrudes downstream in the drive rotation direction and located in a radially outwardly from a contact position where the drive side surface comes into contact with each of the rollers when the chain is driven.

In the sprocket, the first protrusion, which protrudes downward in the drive rotation direction, is provided radially outwardly from a position where the roller comes into contact with the drive side surface. The first protrusion therefore restricts movement of each of the rollers of the chain that comes into contact with the drive side surface, whereby the roller is unlikely to move radially outward. The configuration described above allows an increase in the chain holding force without alternately differentiating the axial thickness of the plurality of tooth portions. Both a sprocket having an even total number of teeth and a sprocket having an odd total number of teeth can therefore provide an increased chain holding force. Further, since one of the front surface and the rear surface has the first chamfered portion tapered and formed in a radially outer portion of the at least one tooth portion, the sprocket that rotates in the drive rotation direction can readily engage with the chain even when the first protrusion is provided to improve the chain holding force.

The first protrusion protrudes downstream in the drive rotation direction from the contact position, where the drive side surface conies into contact with each of the rollers when the chain is driven, by a first distance that is greater than or equal to 0.1 mm but smaller than or equal to 0.5 mm. The configuration allows the tooth portion of the sprocket to readily engage with the chain and prevents the chain that engages with the sprocket from readily disengaging from the sprocket.

The first distance may be greater than or equal to 0.2 mm but smaller than or equal to 0.3 mm.

The first distance may be 0.2 mm.

The non-drive side surface has a raised portion that is convex in a circumferential direction toward the upstream side with respect to the drive rotation direction, and the raised portion protrudes by an amount that is smaller than an amount that the first protrusion protrudes. In this case, providing the raised portion maintains ease of engagement between the tooth portion and the chain and effectively prevents the chain from disengaging from the tooth portion.

The non-drive side surface may have a second protrusion that protrudes in a circumferential direction. Providing the second protrusion restricts radially outward movement of each of the rollers also on the non-drive surface, whereby the chain holding force is further increased.

The tooth portion may have tooth portion has a first tooth, a second tooth and a third tooth, the second tooth being adjacent the first tooth and upstream of the first tooth in the drive rotation direction, the third tooth being adjacent the second tooth and upstream of the second tooth in the drive rotation direction, and a contact position where each of the rollers contacts the drive side surface of the first tooth when the chain is driven is spaced from a tip downstream position that is a position of a tip of the third tooth on a most downstream side with respect to the drive rotation direction by a second distance that is greater than or equal to 25.4 mm but smaller than or equal to 27 mm.

In this case, a threshold distance that is a reference used to determine whether or not the third tooth of the rotating sprocket engages with the chain (distance between first tooth and third tooth) is at least twice the intervals between the rollers of the chain (typically 12.7 mm), whereby the chain is readily caught in a reliable manner.

The second distance may be greater than or equal to 25.4 mm but smaller than or equal to 26.6 mm.

The other one of the front surface and the rear surface may have a second chamfered portion that is formed in a radially outer portion of the at least one tooth portion and tapered radially outward in the axial direction. In this case, since a chamfered portion is provided on each of the front and rear surfaces, the chain further readily engage with the tooth portion of the sprocket.

The front surface may have the first chamfered portion, and the rear surface may have the second chamfered portion.

A radial outer periphery end of the first chamfered portion is spaced from a radial inner periphery end of the first chamfered portion by a third distance in the axial direction, and a radial outer periphery end of the second chamfered portion is spaced from a radial inner periphery end of the second chamfered portion by a fourth distance in the axial direction that is equal to the third distance. In this case, since the axial distances of the first chamfered portion and the second chamfered portion are equal to each other, the chain is unlikely to disengage from the tooth portion even when the chain vibrates in the axial direction.

A radial outer periphery end of the first chamfered portion is spaced from a radial inner periphery end of the first chamfered portion by a third distance in the axial direction, and a radial outer periphery end of the second chamfered portion is spaced from a radial inner periphery end of the second chamfered portion by a fourth distance in the axial direction that differs from the third distance.

The third distance may be greater than the fourth distance.

In this case, since the first chamfered portion formed in the front surface of the sprocket is deeper than the second chamfered portion formed in the rear surface of the sprocket, the extreme tip of the tooth portion of the sprocket is positioned closer to the rear surface. When the sprocket according to the invention is a front sprocket, and the chain is so set from the rear sprocket toward the front sprocket that the chain is inclined obliquely outward in the axial direction, the chain readily engages with the front sprocket.

The tooth portion includes a group of a plurality of first teeth and a group of a plurality of second teeth, each of the first teeth having a first chain engagement thickness in the axial direction, each of the second teeth having a second chain engagement thickness in the axial direction that is greater than the first thickness, and the total number of teeth in the tooth portion is an even number. In this case, the thickness of each of the first teeth is set in accordance with the gap between a pair of inner links of the chain, and the thickness of each of the second teeth is set in accordance with the gap between a pair of outer links of the chain, whereby the chain holding force is further increased.

The first chain engagement thickness of each of the first teeth may be a thickness that allows engagement with inner link plates of the chain, and the second chain engagement thickness of each of the second teeth may be a thickness that allows engagement with outer link plates of the chain.

The group of first teeth and the group of second teeth may be alternately arranged in a circumferential direction.

The tooth portion may be formed of a stacked member including three layers stacked on each other in the axial direction. In this case, using a light material to form the intermediate layer of the stacked member, which does not come into contact with the chain, allows the weight of the sprocket to be reduced.

The stacked member may include a first member made of a first metallic material, a second member made of a second metallic material, and a third member disposed between the first member and the second member in the axial direction and made of a third metallic material, and a specific gravity of the third metallic material may be smaller than a specific gravity of each of the first and second metallic materials. In this case, the third member disposed between the first member and the second member allows the weight of the sprocket to be reduced.

Each of the first and second metallic materials may be iron, and the third metallic material may be aluminum.

The stacked member may include a first member made of a first metallic material, a second member made of a second metallic material, and a third member made of a non-metallic material. In this case, the third member made of a non-metallic material and disposed between the first member and the second member allows the weight of the sprocket to be reduced.

The non-metallic material may contain a resin.

A straight line that connects a contact position where each of the rollers comes into contact with the drive side surface when the chain is driven to the center rotational axis and a line tangential to the drive side surface in the contact position may form an angle smaller than or equal to 7 degrees. In this case, each of the rollers is unlikely to move radially outward on the drive surface, whereby the chain is unlikely to disengage from the sprocket.

A bicycle sprocket according to another aspect of the invention is engageable with a chain having rollers. The bicycle sprocket includes a body and at least one tooth portion. The body is rotatable around a center rotational axis. The at least one tooth portion is provided along a peripheral portion of the body and has a front surface, a rear surface that faces away from the front surface in an axial direction of the center rotational axis, a drive side surface that connects, on a downstream side in a drive rotation direction, the front surface and the rear surface to each other in the axial direction, and a non-drive side surface that connects, on an upstream side with respect to the drive rotation direction, the front surface and the rear surface to each other in the axial direction.

The at least one tooth portion has a first chamfered portion in a radially outer portion of one of the front surface and the rear surface, and the first chamfered portion is on formed that it is tapered radially outward in the axial direction. A straight line that connects a contact position where each of the rollers comes into contact with the drive side surface when the chain is driven to the center rotational axis and a line tangential to the drive side surface in the contact position form an angle smaller than or equal to 7 degrees.

In the bicycle sprocket, each of the rollers is unlikely to move radially outward on the drive surface of the tooth portion, whereby the chain is unlikely to disengage from the sprocket. Further, the configuration described above allows an increase in the chain holding force without alternately differentiating the axial thickness of the plurality of tooth portions.

The angle may be smaller than or equal to 3 degrees.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
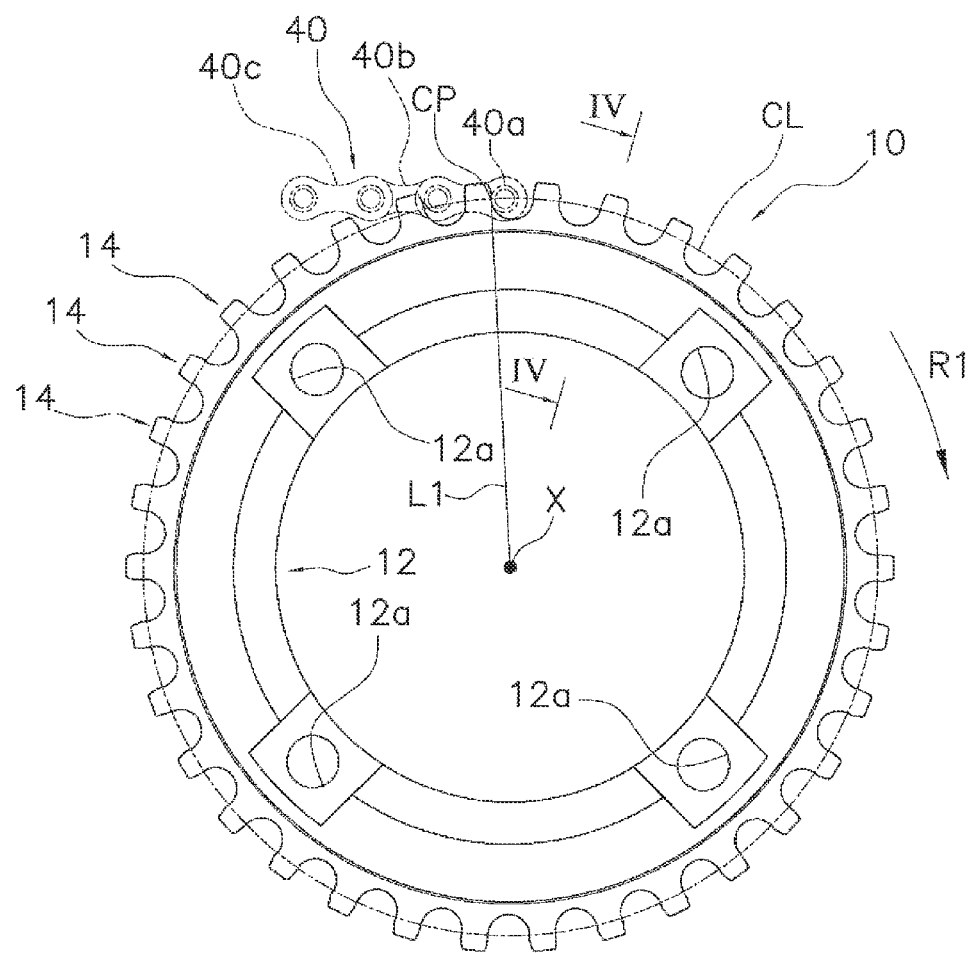
FIG. 1 is a front view of a sprocket according to a first embodiment of the invention.
Figure 2:
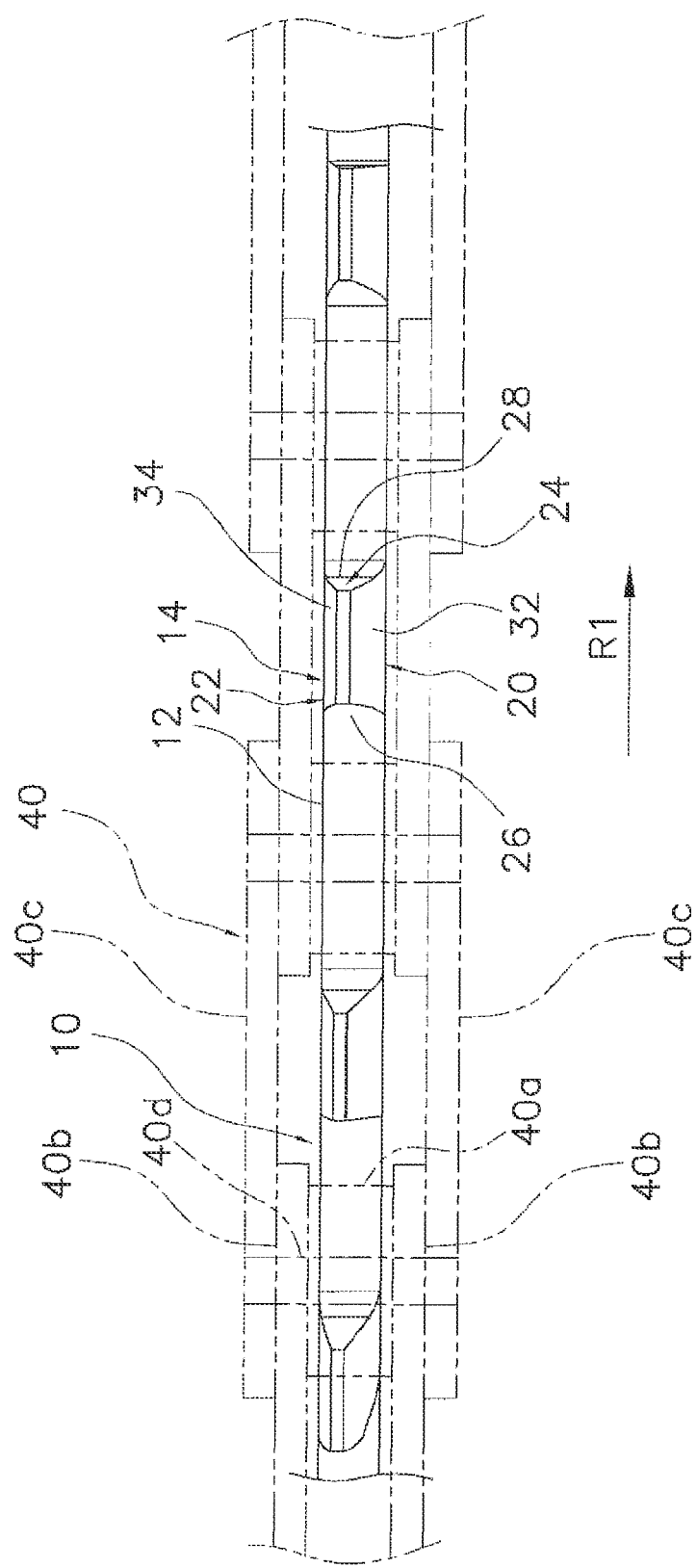
FIG. 2 is an enlarged plan view of the sprocket.

A sprocket 10 according to a first embodiment of the invention is a bicycle sprocket engageable with a chain 40 having rollers 40a, as shown in FIGS. 1 and 2. The sprocket 10 is an example of a bicycle sprocket. The sprocket 10 is used, for example, as a front chain wheel of a bicycle. When attached to a bicycle, the sprocket 10 is typically disposed in a position slightly more separate from the bicycle than an axially central position of a rear sprocket assembly formed of a plurality of rear sprockets. The chain 40 includes rollers 40a, a plurality of pairs of right and left inner link plates 40b, and a plurality of pairs of outer link plates 40c, which are connected to the outer side surfaces of the inner link plates 40b, as shown in FIG. 2. The plurality of inner link plates 40b are pivotally connected to the outer link plates 40c with link pins 40d. Each of the rollers 40a is rotatably attached around the outer circumferential surface of the corresponding link pin 40d. Since the chain 40 is a known bicycle chain, no detailed description of the chain 40 will be made.

The sprocket 10 includes a body 12, which is rotatable around a center rotational axis X, and at least one tooth portion 14, which is provided along a peripheral portion of the body 12, as shown in FIGS. 1 and 2. The body 12 is formed of an annular plate-shaped member made, for example, of iron, aluminum, titanium, or any other metal or a carbon fiber reinforced material or any other non-metallic material. The body 12 has a plurality of crank attachment portions 12a formed in a radially inner portion, and the crank attachment portions 12a are attached to a crank arm (not shown), for example, with a plurality of screw members. In the first embodiment, the body 12 is thicker than the tooth portion 14 in the axial direction of the body 12. The body may instead be as thick as the tooth portion.

Figure 3:
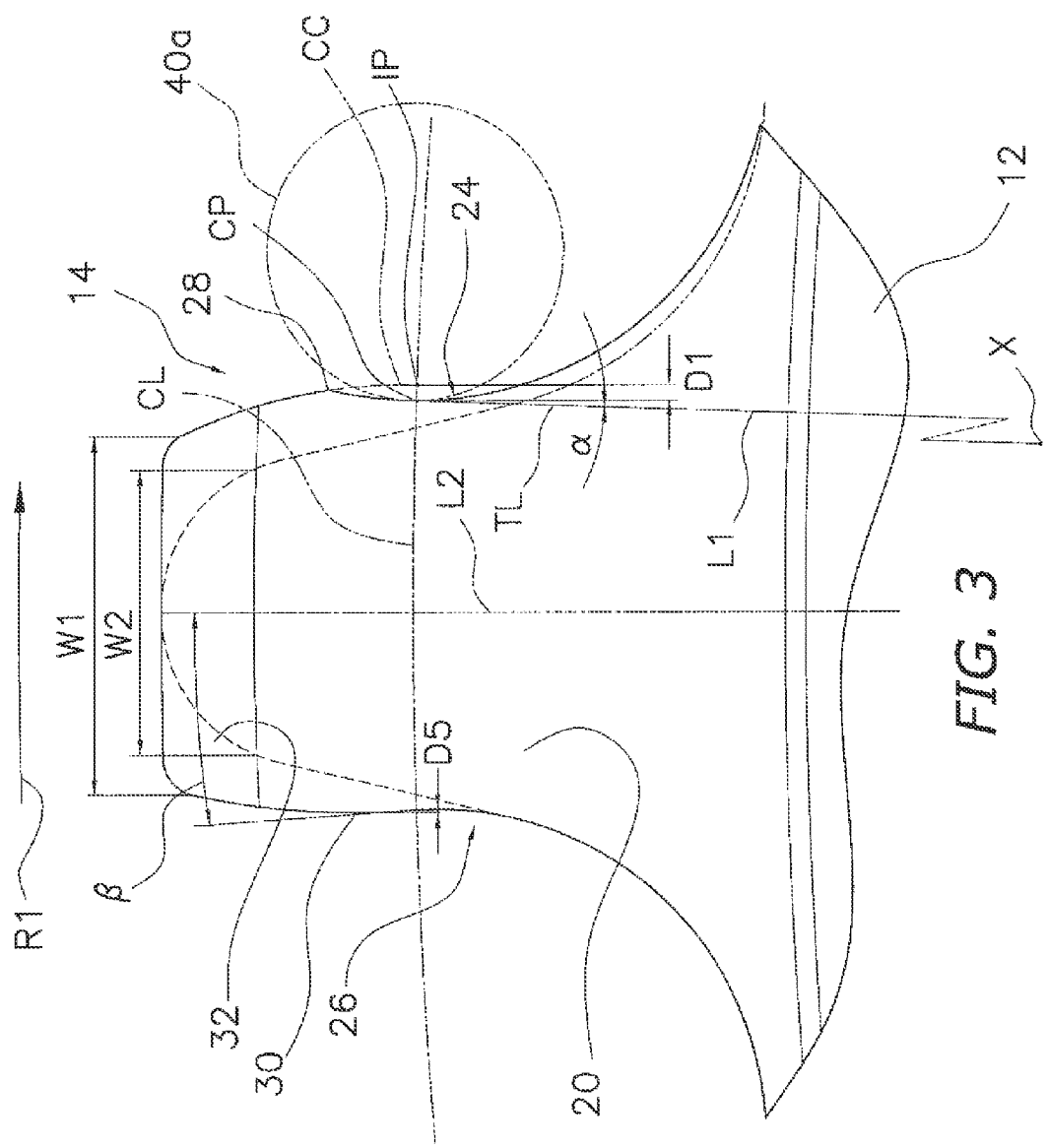
FIG. 3 is a front view of a tooth portion of the sprocket.
Figure 4:
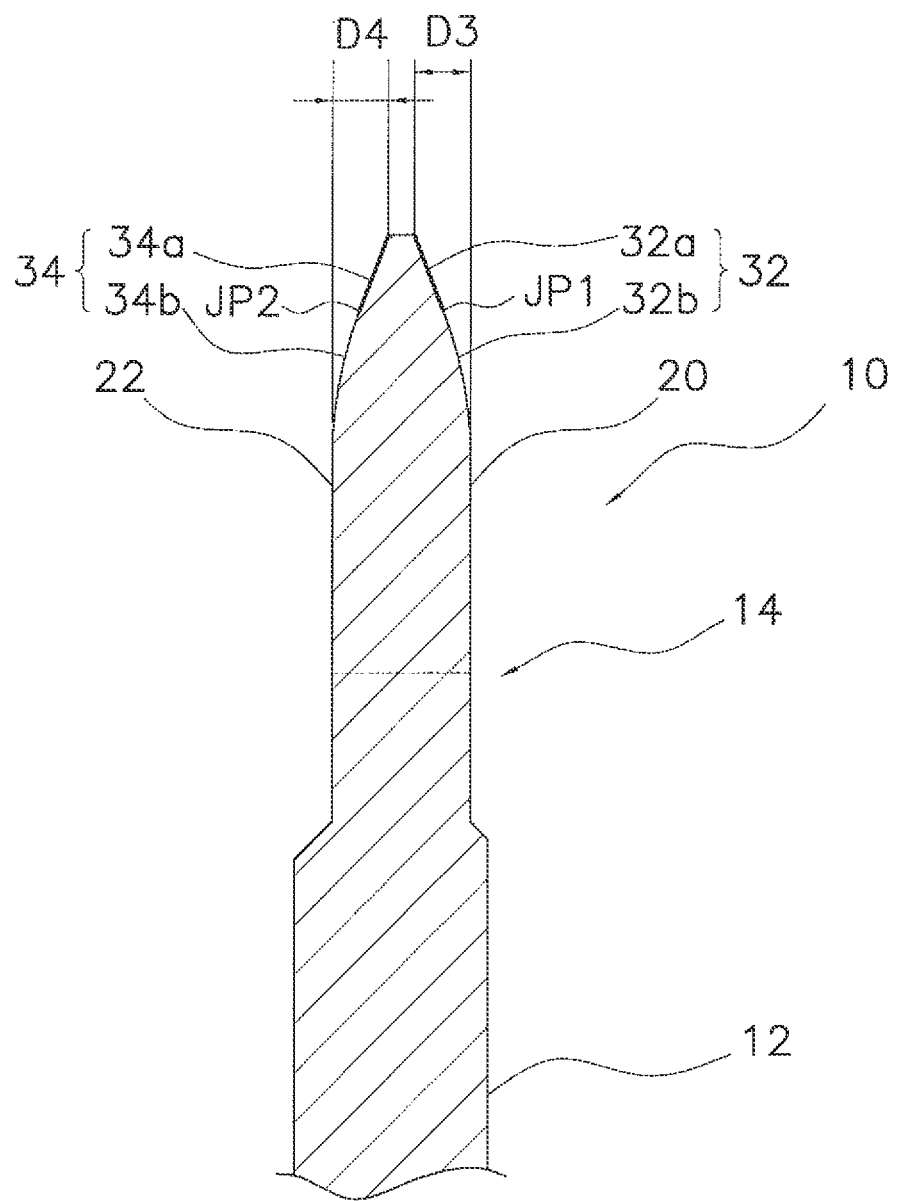
FIG. 4 is a cross-sectional view of the sprocket taken along a cutting line IV-IV in FIG. 1.

The at least one tooth portion 14 has a front surface 20; a rear surface 22, which faces away from the front surface 20 in the axial direction of the center rotational axis X; a drive side surface 24, which connects, on the downstream side (right side in FIG. 3) in a drive rotation direction R1, the front surface 20 and the rear surface 22 to each other in the axial direction; and a non-drive side surface 26, which connects, on the upstream side (left side in FIG. 3) in the drive rotation direction R1, the front surface 20 and the rear surface 22 to each other in the axial direction, as shown in FIGS. 2, 3, and 4. In the first embodiment, the tooth portion 14 is located in a plurality of positions, for example, in 34 positions. The number of tooth portions 14 is not limited to 34. The tooth portion 14 is made, for example, of iron, aluminum, or titanium.

The tooth portion 14 has a first protrusion 28, which protrudes downstream in the drive rotation direction R1 and located radially outwardly from a contact position CP, where the drive side surface 24 comes into contact with each of the rollers 40a when the chain is driven. A portion of the drive side surface 24 that is radially outside the first protrusion 28 is formed of an arcuate surface curved convexly with respect to the first protrusion 28, as shown in FIG. 3. A portion of the drive side surface 24 that is radially inside the first protrusion 28 is formed of an arcuate surface curved concavely with respect to the first protrusion 28. The first protrusion 28 protrudes downstream in the drive rotation direction R1 from the contact position CP, where each of the rollers 40a comes into contact with the drive side surface 24. A first distance D1 by which the first protrusion 28 protrudes downstream in the drive rotation direction R1 from the contact position CP is, for example, greater than or equal to 0.1 mm but smaller than or equal to 0.5 mm. The first distance D1 is preferably greater than or equal to 0.2 mm but smaller than or equal to 0.3 mm. In the first embodiment, the first distance D1 is, e.g., 0.2 mm. The first distance D1 is defined, by extending the arc radially outside the first protrusion 28 to a contact circle CL passing through the contact position CP, as the distance from the contact position CP to a point of intersection of the arc CC and the contact circle CL. When the portion of the tooth portion 14 that is radially outside the first protrusion 28 has a straight line segment instead of the arcuate segment, the first distance D1 may be defined by drawing an imaginary line from the circumferentially most protruding end of the first protrusion 28 toward the center rotational axis X and measuring the distance to a point of intersection IP of the imaginary straight line and the contact circle CL passing through the contact position CP. Providing the drive side surface 24 with the thus configured first protrusion 28 prevents movement of each of the rollers 40a of the chain 40 that is in contact with the drive side surface 24, and the roller 40a is unlikely to move outward in the radial direction. Further, the thickness of the plurality of tooth portions 14 in the axial direction may be slightly smaller than the gap between the pair of inner links. As a result, the chain holding force can be increased without alternately differentiating the thickness of the tooth portions 14 of the sprocket 10.

A straight line L1, which connects the contact position CP, where each of the rollers 40a comes into contact with the drive side surface 24 when the chain is driven, to the center rotational axis X and a line TL tangential to the drive side surface 24 in the contact position CP form an angle α greater than or equal to −7 degrees but smaller than or equal to 7 degrees. The angle α is preferably greater than or equal to −3 degrees but smaller than or equal to 3 degrees. The angle α set to fall within the range described above produces steep inclination of the drive side surface 24 of the tooth portion 14 in the contact position CP, and each of the rollers 40a is unlikely to move radially outward on the drive side surface

24. A tooth tip width W1 of the tooth portion 14 is preferably set to be greater than a tooth tip width W2 of a tooth portion of related art indicated by the dotted line as shown in FIG. 3. In this case, the chain 40 is more unlikely to disengage from the tooth portion 14 of the sprocket 10.

The non-drive side surface 26 has no protrusion, such as the first protrusion 28 on the drive side surface 24, formed thereon. The non-drive side surface 26 instead has a raised portion 30 formed thereon. The raised portion 30 is formed radially outwardly from the contact circle CL that is slightly convex toward the upstream side with respect to the drive rotation direction R1. The amount of protrusion D5 of the raised portion 30 on the non-drive side surface 26 is smaller than the amount of protrusion of the first protrusion on the drive side surface 24 (first distance D1). In the first embodiment, the drive side surface 24 and the non-drive side surface 26 are therefore asymmetric with respect to a straight line L2, which connects the center rotational axis X to the circumferentially central position of the tooth portion 14. The shape of the tooth portion 14 described above maintains ease of engagement between the tooth portion 14 and the chain 40 and effectively prevents the chain 40 from disengaging from the tooth portion 14. An angle β between a rise initiation portion of the raised portion 30 and the straight line L2 ranges, for example, from 4 degrees to 5 degrees. Further, the raised portion 30 on the non-drive side surface 26 is not necessarily formed.

Figure 5:
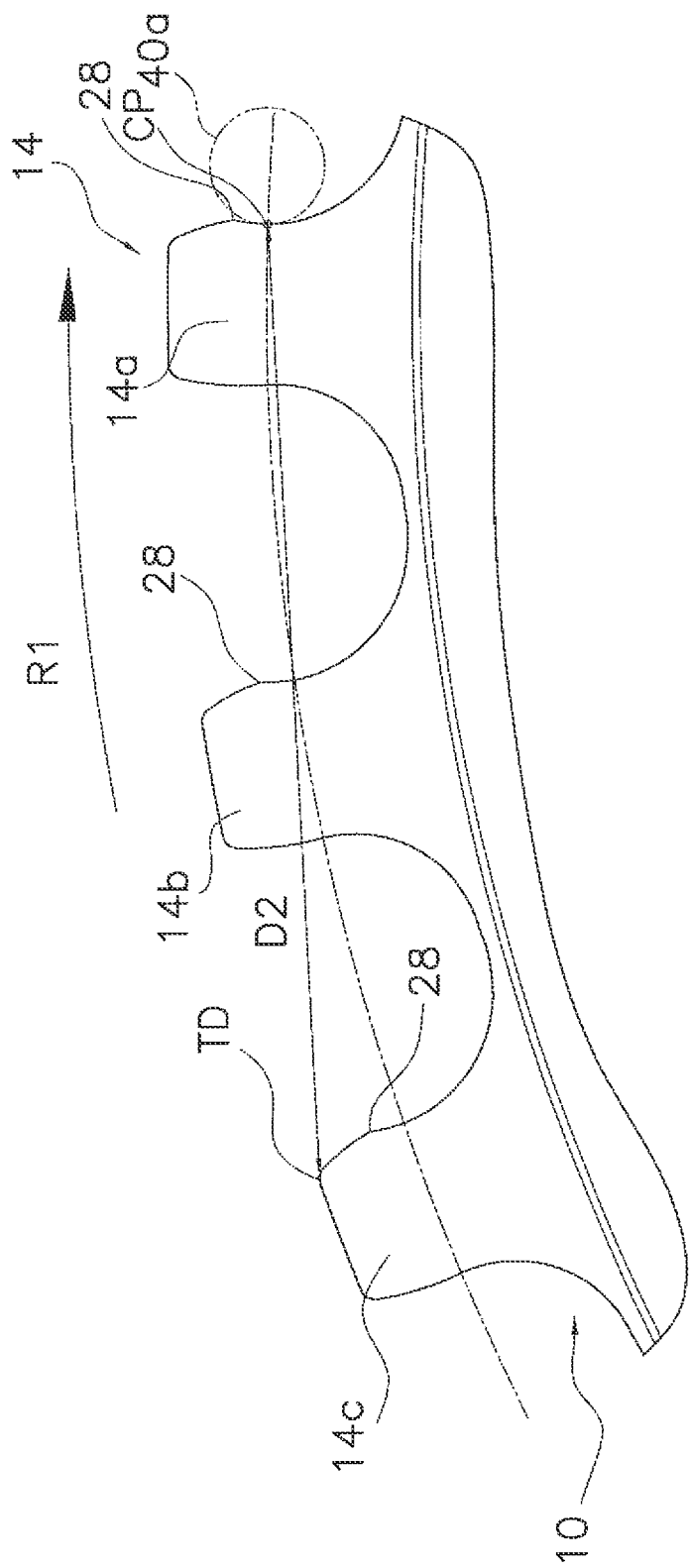
FIG. 5 is a partial front view of the sprocket and describes a threshold distance.

The tooth portion 14 has a first tooth 14*a*; a second tooth 14*b*, which is adjacent to the first tooth 14*a* and upstream of the first tooth 14*a* in the drive rotation direction R1; and a third tooth 14*c*, which is adjacent to the second tooth 14*b* and upstream of the second tooth 14*b* in the drive rotation direction R1, as shown in FIG. 5. A second distance D2 between a contact position CP, where each of the rollers 40*a* conies into contact with the drive side surface 24 of the first tooth 14*a* when the chain is driven, and a tip downstream position TD, which is the position of the tip of the third tooth 14*c* on the most downstream side with respect to the drive rotation direction, is preferably greater than or equal to 25.4 mm but smaller than or equal to 27 mm. The second distance D2 is a threshold distance that allows the chain 40 that engages with the first tooth 14*a* to readily engage with the third tooth 14*c*. A large second distance D2 makes it difficult for the chain 40 to engage with the third tooth 14*c* or is likely to cause the chain 40 to fall. The second distance D2 is preferably greater than or equal to 25.4 mm but smatter than or equal to 26.6 mm. The second distance D2 is set in consideration of the amount of stretch of the chain 40.

One of the front surface 20 and the rear surface 22 has a first chamfered portion 32, which is formed in a radially outer portion of the tooth portion 14 and tapered radially outward in the axial direction. The other one of the front surface 20 and the rear surface 22 has a second chamfered portion 34, which is formed in a radially outer portion of the tooth portion 14 and tapered radially outward in the axial direction. In the first embodiment, the front surface 20 has the first chamfered portion 32, and the rear surface 22 has the second chamfered portion 34. Since the front surface 20 has the first chamfered portion 32, and the rear surface 22 has the second chamfered portion 34, the chain 40 readily engages with the tooth portion 14, that is, the third tooth 14*c* readily engages with the chain 40 even when the chain is driven with the chain 40 obliquely set.

The first chamfered portion 32 has a radially outer portion formed of a first tapered surface 32*a*, which is indicated by the straight thick line in a cross-sectional view, and a radially inner portion formed of a first curved surface 32*b*, which connects the first tapered surface 32*a* to the front surface 20 in an arcuate shape in a cross-sectional view, as shown in FIG. 4. The second chamfered portion 34 has a radially outer portion formed of a second tapered surface 34*a*, which is indicated by the straight thick line in a cross-sectional view, and a radially inner portion formed of a second curved surface 34*b*, which connects the second tapered surface 34*a* to the rear surface 22 in an arcuate shape in a cross-sectional view. Each of the first chamfered portion 32 and the second chamfered portion 34 may instead be formed entirely of a tapered surface or a curved surface. A first connection position JP1, where the first tapered surface 32*a* and the first curved surface 32*b* are connected to each other, and a second connection position JP2, where the second tapered surface 34*a* and the second curved surface 34*b* are connected to each other, are located in the same radially outer position. As described above, since the front surface 20 has the first chamfered portion 32 and the rear surface 22 has the second chamfered portion 34, the chain 40 readily engages with the sprocket 10.

A third distance D3 in the axial direction between a radial outer periphery end and a radial inner periphery end of the first chamfered portion 32 is equal to a fourth distance D4 in the axial direction between a radial outer periphery end and a radial inner periphery end of the second chamfered portion 34. Each of the third distance D3 and the fourth distance D4 is preferably greater than or equal to 0.75 mm but smaller than or equal to 0.95 mm. In the first embodiment, each of the third distance D3 and the fourth distance D4 is 0.875 mm. The distance between the front surface 20 and the rear surface 22 of the tooth portion 14 is, for example, 2.1 mm. The thickness of the tip of the tooth portion 14 is therefore 0.35 mm.

The second distance D2 described above affects ease of engagement between the tooth portion 14 and the chain 40 in the forward rotation of the sprocket 10. When the chain 40 is driven with the chain 40 so set that the chain 40 is oriented from a rear sprocket assembly obliquely toward the sprocket 10, which is a front chain wheel, a shorter second distance D2 allows the tooth portion 14 of the sprocket 10 to more readily engage with the chain 40. This is because when the first tooth 14*a* drives the chain 40 in the state shown in FIG. 5, the axial distance between the tip downstream position TD, which is the position of the tip of the third tooth 14*c* on the most downstream side with respect to the drive rotation direction, and the chain 40 is small. The second distance D2 is, however, determined in accordance with the intervals between the rollers of the chain 40 and preferably has a length at least twice the intervals between the rollers of the chain 40. Further, a relatively large value of the third distance D3 described above allows the tooth portion 14 of the sprocket 10 to readily engage with the chain 40 when the chain is driven, but too large a value of the third distance D3 is likely to cause the chain 40 to disengage from the tooth portion 14 when the chain 40 vibrates in the axial direction. In view of the facts described above, in the first embodiment, the third distance D3 and the fourth distance D4 are set to be equal to each other.

In the thus configured sprocket 10, even when the bicycle travels on a rough road having irregularities, and the chain 40 therefore vibrates and is about to move in a direction that causes disengagement of the chain 40, the first protrusion 28, which is provided on the drive side surface 24 of the tooth portion 14 and protrudes downward in the drive rotation direction R1, restricts radially outward movement of the chain 40. The chain 40 is therefore unlikely to result in disengagement even when the bicycle travels on a rough road. Further, to allow the sprocket 10 to readily engage with the chain 40 when the sprocket 10 rotates in the drive direction, the second distance D2 is set at a value slightly greater than twice the intervals between the links of the chain 40. As a result, even when the chain 40 is driven with the chain 40 inclined in the axial direction between the sprocket 10 and the rear sprocket, the chain 40 readily engages with the tooth portion 14. The chain 40 can therefore be effectively caught even when the first protrusion 28 is provided. Further, since the third distance D3 and the fourth distance D4 are set at the same value, the chain 40 is unlikely to disengage from the tooth portion 14 even when the chain vibrates in the axial direction.

Second Embodiment

Figure 6:
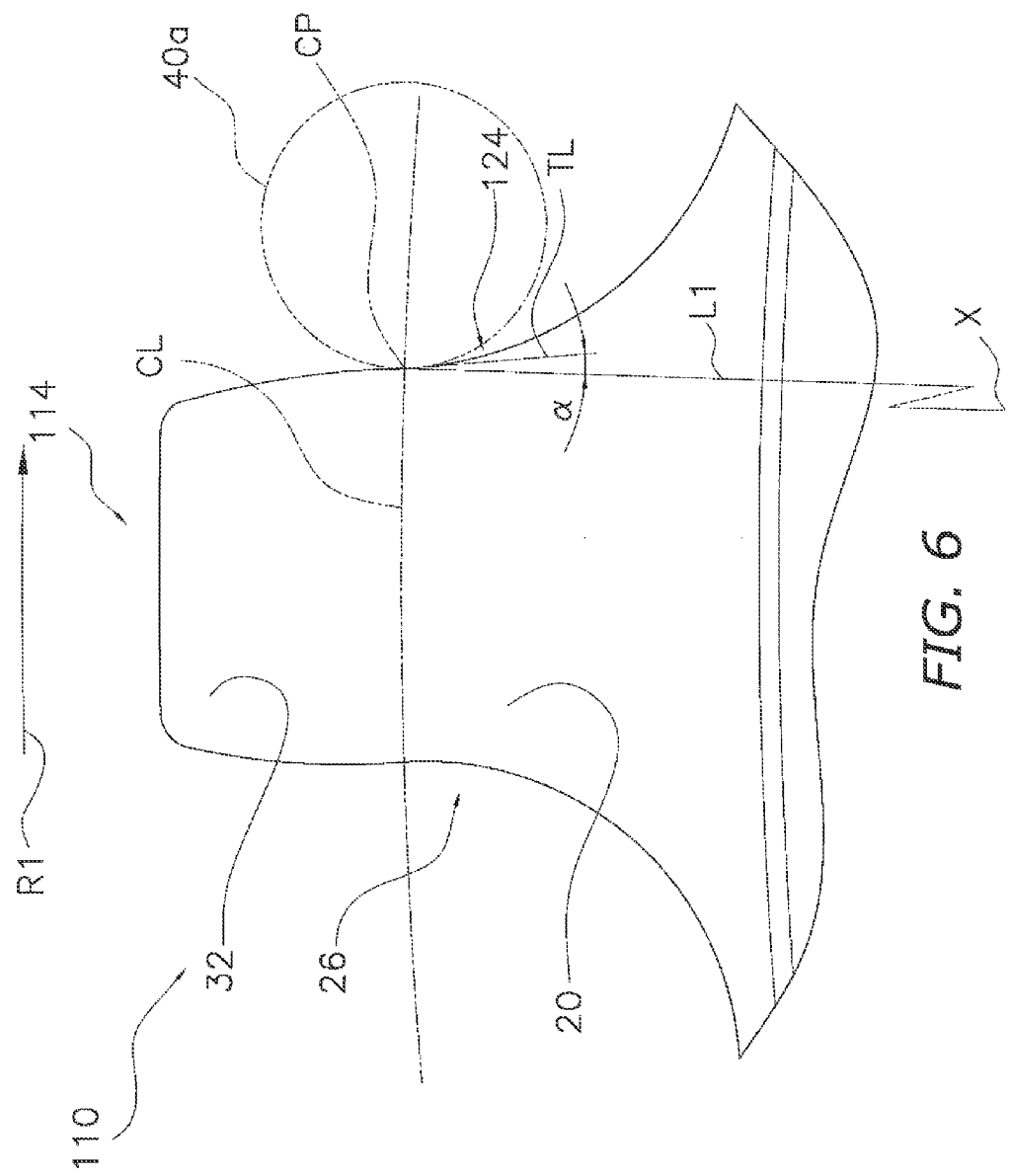
FIG. 6 shows a sprocket according to a second embodiment of the invention and corresponds to FIG. 2.

In FIG. 6, a sprocket 110 according to a second embodiment is a bicycle sprocket engageable with the chain 40 having the rollers 40a, but the tooth portion 114 differs from the tooth portion in the first embodiment. The tooth portion 114 has no first protrusion. The sprocket 110 includes the body 12, which is rotatable around the center rotational axis X, and at least one tooth portion 114, as in the first embodiment. In the following description, the same components as those in the first embodiment have the same reference characters as those in the first embodiment, and no description thereof will be made. Components different from those in the first embodiment have three-digit reference characters with the last two digits being equal to the reference characters in t e first embodiment in the description.

The at least one tooth portion 114 has the front surface 20; a rear surface (not shown) that faces away from the front surface 20 in the axial direction of the center rotational axis X; a drive side surface 124, which connects, on the downstream side (right side in FIG. 6) in the drive rotation direction R1, the front surface 20 and the rear surface to each other in the axial direction; and the non-drive side surface 26, which connects, on the upstream side (left side in FIG. 6) in the drive rotation direction R1, the front surface 20 and the rear surface to each other in the axial direction. In the second embodiment, the tooth portion 114 is located in a plurality of positions, for example, in 34 positions. The number of tooth portions 114 is not limited to "34".

The straight line L1, which connects the contact position CP, where each of the rollers 40a comes into contact with the drive side surface 124 when the chain is driven, to the center rotational axis X and the line TL tangential to the drive side surface 124 in the contact position CP form the angle α greater than or equal to −7 degrees but smaller than or equal to 7 degrees. The angle α is preferably greater than or equal to −3 degrees but smaller than or equal to 3 degrees. In the second embodiment, the angle α between the straight line L1 and the tangential line is set to be greater than the angle α in the first embodiment. The angle α set to fall within the range described above produces steep inclination of the drive side surface 124 of the tooth portion 114 in the contact position CP, and each of the rollers 40a is unlikely to move radially outward on the drive side surface 124.

In the second embodiment, the other components are the same as those in the first embodiment. That is, the sprocket 110 according to the second embodiment has the first chamfered portion 32 and the second chamfered portion 34 as in the first embodiment. Further, the second distance D2, the third distance D3, and the fourth distance D4 are set in the same ranges as those in the first embodiment.

Variations

Embodiments of the invention have been described above, but the invention is not limited to the embodiments described above, and a variety of changes can be made thereto to the extent that the changes do not depart from the substance of the invention. In particular, the plurality of embodiments and variations described herein can be arbitrarily combined with each other as required.

Figure 7:
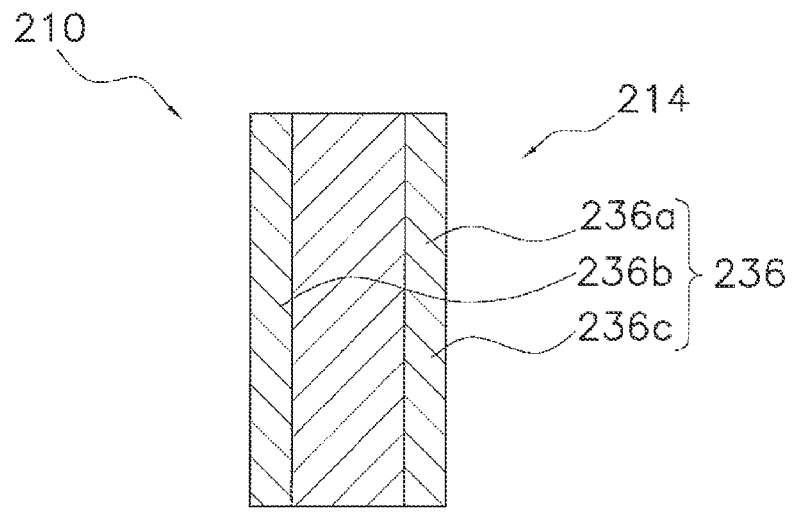
FIG. 7 is a diagrammatic cross-sectional view of a sprocket according to Variation 1.

(a) In the first and second embodiments, the tooth portion 14 (or 114) is made of a single metallic material, but the invention is not limited thereto. In Variation 1 shown in FIG. 7, the configuration of a tooth portion 214 of a sprocket 210 differs from those in the first and second embodiments. That is, the tooth portion 214 is formed of a stacked member 236 including three layers stacked on each other in the axial direction of the center rotational axis X. The stacked member 236 includes a first member 236a, which is made of a first metallic material, a second member 236b, which is made of a second metallic material, and a third member 236c, which is disposed between the first member 236a and the second member 236b in the axial direction and made of a third metallic material. The specific gravity of the third metallic material is smaller than the specific gravity of each of the first metallic material and the second metallic material. Each of the first metallic material and the second metallic material is, for example, iron, and the third metallic material is, for example, aluminum. Each of the first metallic material and the second metallic material is, however, not limited to iron. The third metallic material is not limited to aluminum.

In Variation 1, in the tooth portion 214, the first member 236a on the front side and the second member 236b on the rear side, which come into contact with the chain 40 and hence need to have sufficient strength, are made of iron, which has large specific gravity and high strength, whereas the third member 236c, which is an intermediate layer and does not need to be so strong, is made of aluminum, which has small specific gravity, whereby the strength of the sprocket 210 is maintained and the weight thereof is reduced. The structure of the body as well as the tooth portion 214 can be the three-layer structure.

Figure 8:
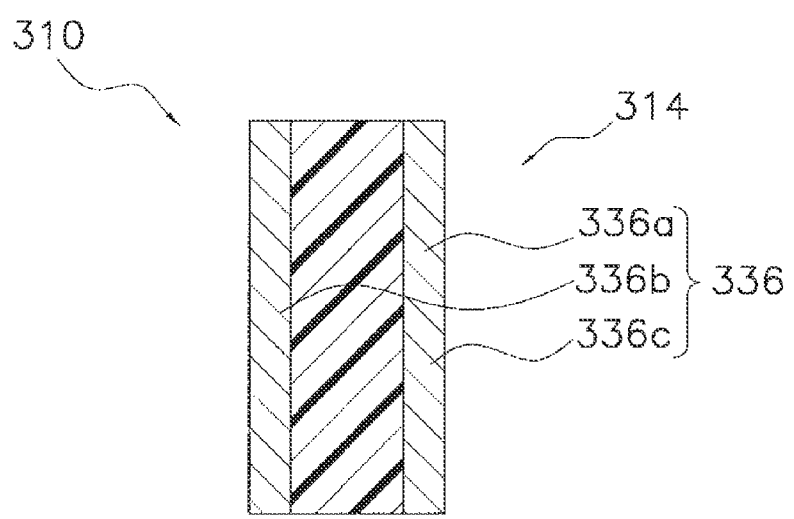
FIG. 8 is a diagrammatic cross-sectional view of a sprocket according to Variation 2.

(b) In Variation 2 shown in FIG. 8, a three-layer stacked member 336 of a tooth portion 314 of a sprocket 310 differs from that in Variation 1 and includes a first member 336a, which is made of a first metallic material, a second member 336b, which is made of a second metallic material, and a third member 336c, which is made of a non-metallic material. Each of the first metallic material and the second metallic material is, for example, iron, and the non-metallic material, for example, contains a resin. Each of the first metallic material and the second metallic material is not limited to iron. The non-metallic material is not limited to a resin.

In Variation 2, in the tooth portion 314, the first member 336a on the front side and the second member 336b on the rear side, which come into contact with the chain 40 and hence need to have sufficient strength, are made of iron, which has high strength, whereas the third member 336c, which is an intermediate layer and does not need to be so strong, includes a resin, which has specific gravity smaller than that of iron, whereby the strength of the sprocket 310 is maintained and the weight thereof is reduced. The structure of the body as well as the tooth portion 314 can be the three-layer structure.

(c) In the first and second embodiments, the non-drive side surface 26 has no protrusion that protrudes in the circumferential direction, but the invention is not limited thereto.

Figure 9:
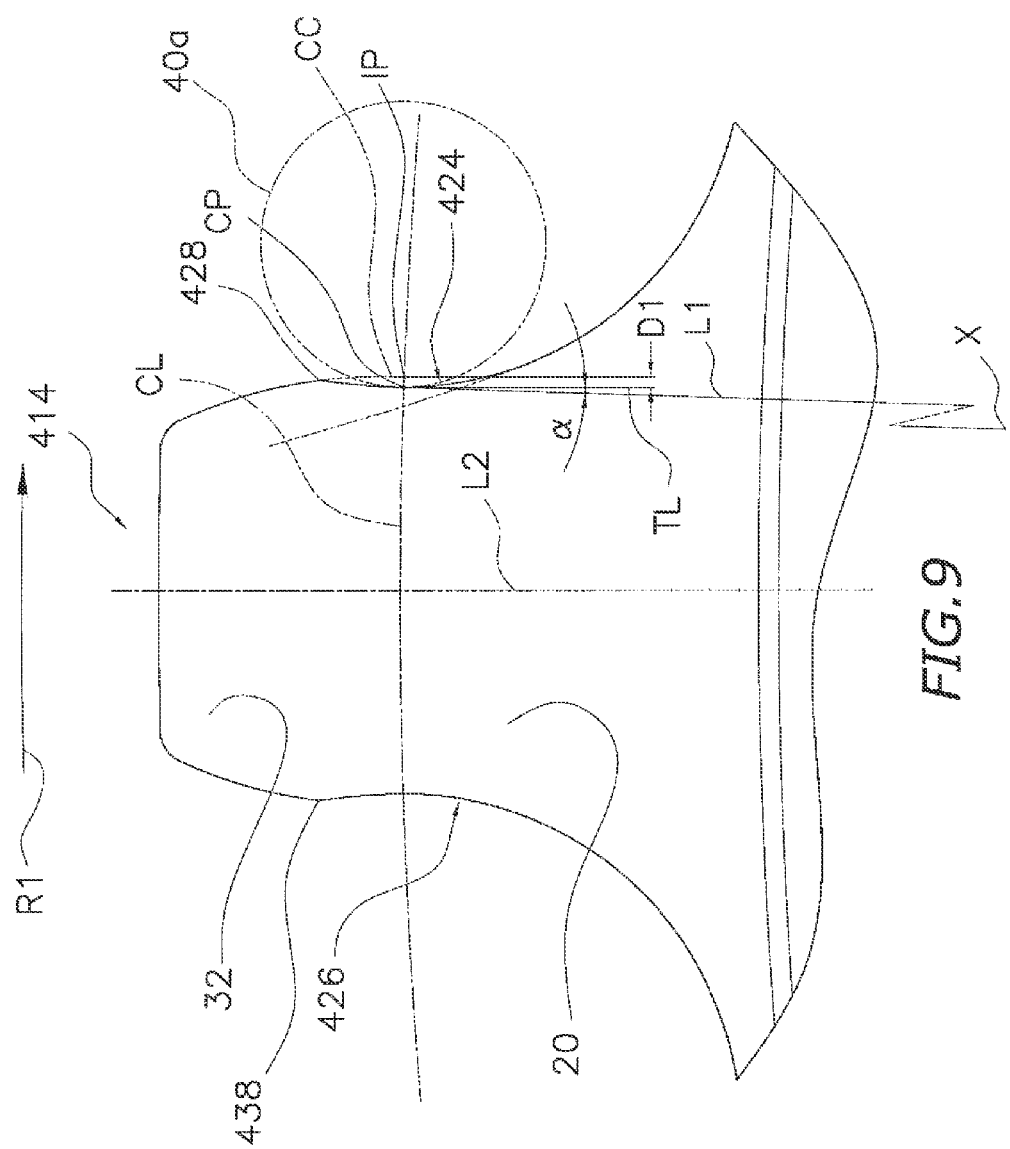
FIG. 9 shows a sprocket according to Variation 3 and corresponds to FIG. 3.

A tooth portion 414 of a sprocket 410 in Variation 3 shown in FIG. 9 has a non-drive side surface 426 having a second protrusion 438, which protrudes in the circumferential direction. Further a drive side surface 424 has a first protrusion 428. The first distance D1 associated with the first protrusion 428 is smaller than the first distance D1 associated with the first protrusion 28 in the first embodiment and is, for example, 0.15 mm. Further, the angle α is, for example, 2 degrees.

The drive side surface 424 and the non-drive side surface 426 are symmetric with respect to the straight line L2, which connects the center rotational axis X to the circumferentially central position of the tooth portion 414. The first protrusion 428 and the second protrusion 438 therefore have the same amount of protrusion.

The sprocket 410, which has the second protrusion 438 provided on the non-drive side surface 426, provides a further increased chain holding force. In FIG. 9 in Variation 3, the drive side surface 424 has the first protrusion 428, but the drive side surface may have no first protrusion, as in the second embodiment shown in FIG. 6.

Figure 10:
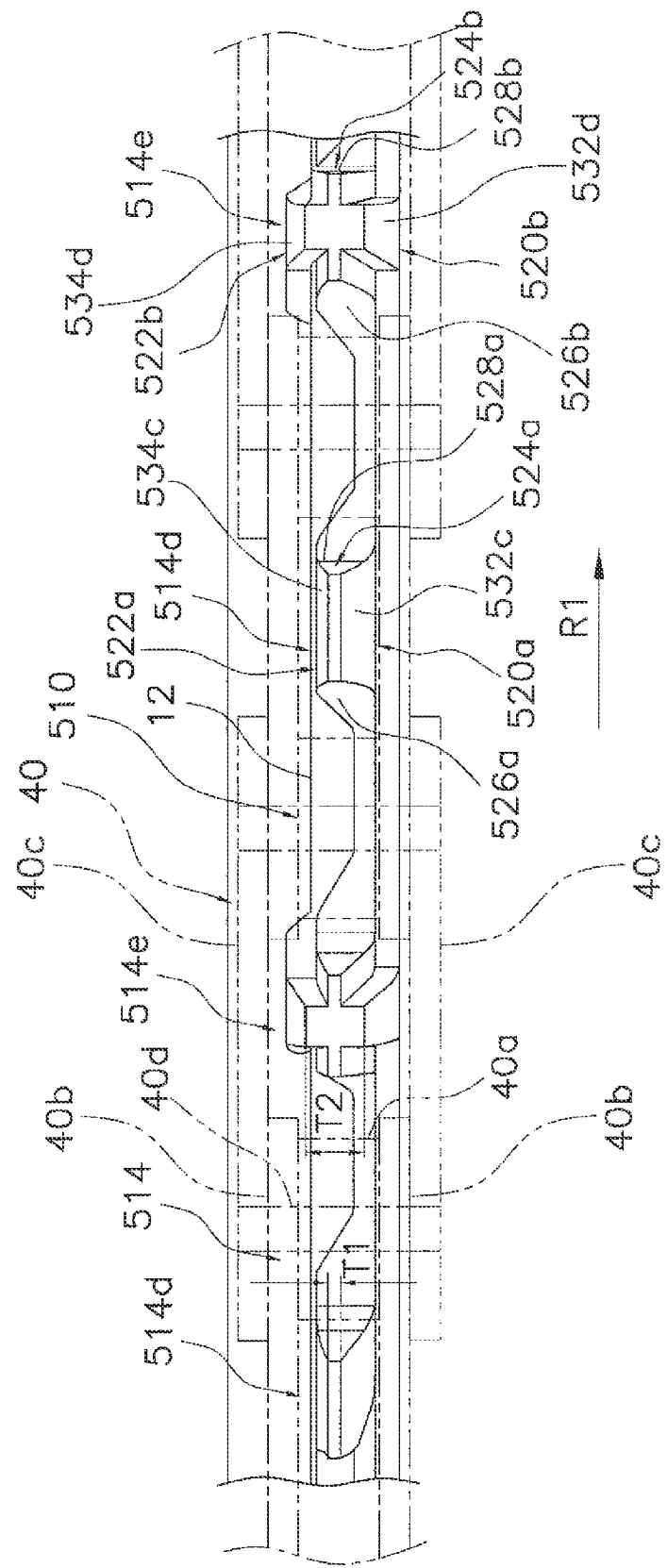
FIG. 10 shows a sprocket according to Variation 4 and corresponds to FIG. 2.

(d) In the first and second embodiments and Variations 1 to 3 described above, the tooth portion of the sprocket has a fixed length in the axial direction (thickness), but the invention is not limited thereto. In Variation 4 shown in FIG. 10, a tooth portion 514 of a sprocket 510 includes a group of a plurality of first teeth 514$d$, each of which has a first chain engagement thickness T1 in the axial direction, and a group of a plurality of second teeth 514$e$, each of which has a second chain engagement thickness T2, which is greater than the first chain engagement thickness T1, in the axial direction, and the total number of tooth portions 514 is an even number. The first chain engagement thickness T1 of each of the first teeth 514$d$ is a thickness that allows engagement with the inner link plates 40$b$ of the chain 40, and the second chain engagement thickness T2 of each of the second teeth 514$e$ is a thickness that allows engagement with the outer link plates 40$c$ of the chain 40 but does not allow the group of second teeth 514$e$ to engage with the inner link plates 40$b$. In Variation 5, the group of first teeth 514$d$ and the group of second teeth 514$e$, are alternately arranged in the circumferential direction.

The first chain engagement thickness T1 of the group of first teeth 514$d$ is preferably greater than or equal to 1.5 mm but smaller than or equal to 2.3 mm. The first chain engagement thickness T1 of the group of first teeth 514$d$ set to fall within the range described above allows the group of first teeth 514$d$ to have necessary rigidity and to readily engage with the inner link plates 40$b$. The second chain engagement thickness T2 of the group of second teeth 514$e$ is preferably greater than or equal to 2.5 mm but smaller than or equal to 5.4 mm, more preferably greater than or equal to 3.0 mm but smaller than or equal to 4.5 mm. The second chain engagement thickness T2 of the group of second teeth 514$e$ set to fall within the range described above prevents the group of second teeth 514$e$ from engaging with the inner link plates 40$b$ but allows the group of second teeth 514$e$ to readily engage with the outer link plates 40$c$.

On the other hand, each of the first teeth 514$d$ preferably has a bar-like (−) shape when viewed from the radially outer side. Each of the second teeth 514$e$ preferably has a crosshair-like (+) shape when viewed from the radially outer side. Further, a front surface 520$a$ of each of the first teeth 514$d$ has a first chamfered portion 532$c$, which is so tapered that the axial width of the tooth gradually decreases radially outward. A rear surface 522$a$ of each of the first teeth 514$d$ has a second chamfered portion 534$c$, which is so tapered that the axial width of the tooth gradually decreases radially outward. A front surface 520$b$ of each of the second teeth 514$e$ has a first chamfered portion 532$d$, which is so tapered that the axial width of the tooth gradually decreases radially outward. A rear surface 522$b$ of each of the second teeth 514$e$ has a second chamfered portion 534$d$, which is so tapered that the axial width of the tooth gradually decreases radially outward. The chamfered portions allow the group of first teeth 514$d$ and the group of second teeth 514$e$ to readily engage with the inner link plates 40$b$ and the outer link plates 40$c$. Further, a non-drive side surface 526$a$ of each of the first teeth 514$d$ has no protrusion, whereas a drive side surface 524$a$ has a first protrusion 528$a$ having the same configuration as that in the first embodiment. The non-drive side surface 526$b$ of each of the second teeth 514$e$ has no protrusion, whereas a drive side surface 524$b$ has first protrusion 528$b$ having the same configuration as that in the first embodiment.

The thus configured sprocket 510, in which the alternately arranged first teeth 514$d$ and second teeth 514$e$ have axial thicknesses corresponding to the inner link plates 40$b$ and the outer link plates 40$c$ of the chain 40 respectively, can provide a further increased chain holding force.

In Variation 4, the drive side surface 524$a$ of each of the first teeth 514$d$ has the first protrusion 528$a$, and the drive side surface 524$b$ of each of the second teeth 514$e$ has the first protrusion 528$b$. Variation 4 is, however, not limited thereto, and the drive side surfaces may have no first protrusion and have the same configuration as that of the drive side surface disclosed in the second embodiment. Further, the non-drive side surfaces 526, which have no protrusion, may have second protrusions, such as the second protrusion shown in Variation 3. Moreover, the number of first teeth may differ from the number of second teeth. In this case, the number of second teeth may be smaller than the number of first teeth. It is, however, noted that the group of first teeth and the group of second teeth need to be so arranged that the group of first teeth engage with the inner link plates and the outer link plates, and that the group of second teeth engage only with the outer link plates.

Figure 11:
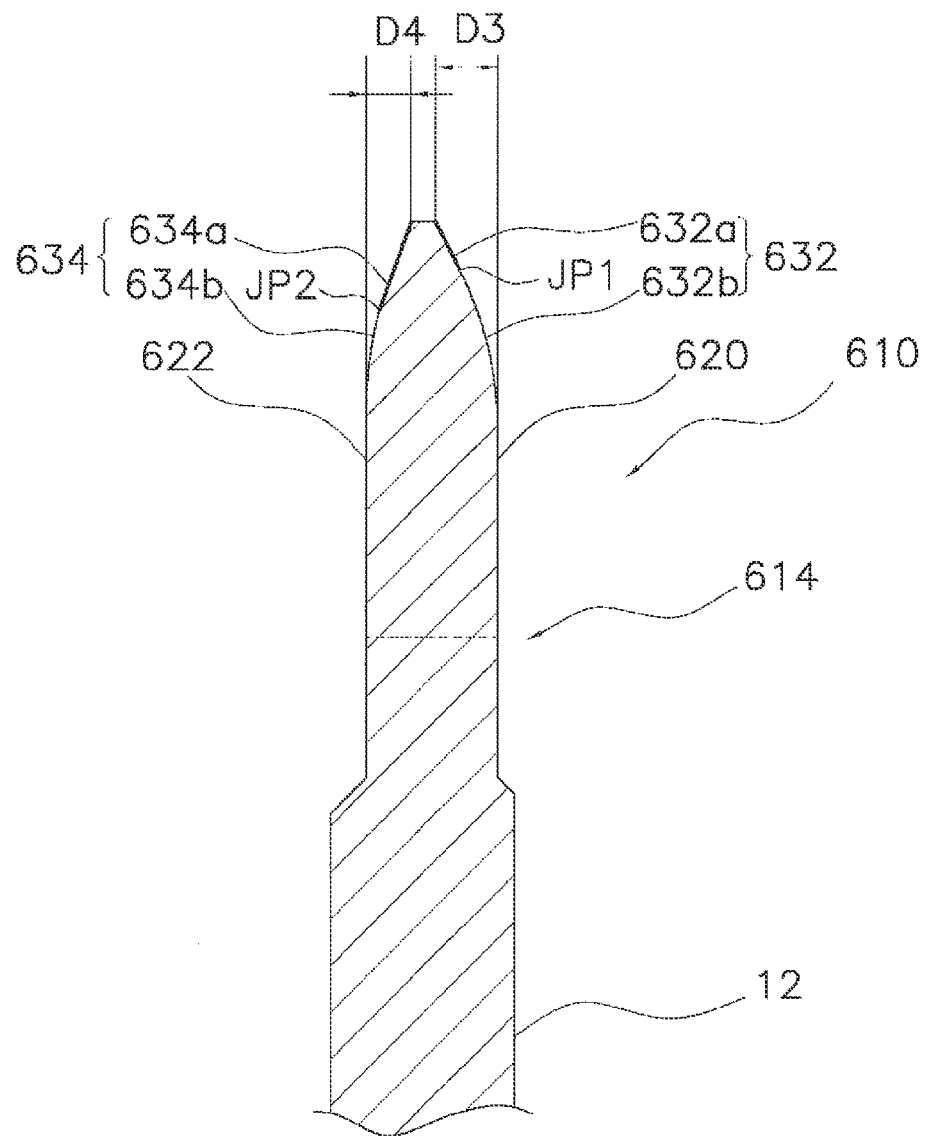
FIG. 11 shows a sprocket according to Variation 5 and corresponds to FIG. 4.

(e) In the first embodiment, the third distance D3 associated with the first chamfered portion 32 and the fourth distance D4 associated with the second chamfered portion 34 are equal to each other, but the invention is not limited thereto. In Variation 5 shown in FIG. 11, a radially outer portion of a first chamfered portion 632 of a tooth portion 614 of a sprocket 610 is formed of a first tapered surface 632$a$ indicated by a straight thick line in a cross-sectional view, and a radially inner portion is formed of a first curved surface 632$b$, which connects the first tapered surface 632$a$ to a front surface 620 in an arcuate shape in a cross-sectional view. A second chamfered portion 634 has a radially outer portion formed of a second tapered surface 634$a$, which is indicated by the straight thick line in a cross-sectional view, and a radially inner portion formed of a second curved surface 634$b$, which connects the second tapered surface 634$a$ to a rear surface 622 in an arcuate shape in a cross-sectional view. Each of the first chamfered portion 632 and the second chamfered portion 634 may be formed entirely of a tapered surface or a curved surface. The first connection position JP1, where the first tapered surface 632$a$ and the first curved surface 632$b$ are connected to each other, is located in a radially outside position than the second connection position JP2, where the second tapered surface 634$a$ and the second curved surface 634$b$ are connected to each other. As described above, since the front surface 620 has the first chamfered portion 632 and the rear surface 622 has the second chamfered portion 634, the chain 40 readily engages with the sprocket 610.

The third distance D3 in the axial direction between a radial outer periphery end and a radial inner periphery end of the first chamfered portion 632 differs from the fourth distance D4 in the axial direction between a radial outer periphery end and a radial inner periphery end of the second chamfered portion 634. In Variation 5, the third distance D3 is greater than the fourth distance D4. The third distance D3 is preferably greater than or equal to 0.9 mm but smaller than or equal to 1.1 mm, and the fourth distance D4 is preferably greater than or equal to 0.6 mm but smaller than or equal to 0.9 mm. In Variation 5, the third distance D3 is 1 mm, and the fourth distance D4 is 0.75 mm. The distance between the front surface 620 and the rear surface 622 of the tooth portion 614 is, for example, 2.1 mm. The thickness of the tip of the tooth portion 614 is therefore 0.35 mm.

(f) In the embodiments and the variations described above, the front surface has a first chamfered portion and the rear surface has a second chamfered portion. Conversely, the front surface may have a second chamfered portion and the rear surface may have a first chamfered portion.

(g) In the embodiments and the variations described above, a single sprocket is disclosed, but the invention is not limited thereto. The invention is also applicable to a sprocket unit having a plurality of sprockets arranged in the axial direction. In this case, the sprocket 10 has at least one speed change tooth. Further, the invention is applicable to all bicycle sprockets including a rear sprocket having a small number of teeth.

According to the invention, the first protrusion restricts movement of a roller of the chain that comes into contact with the drive side surface, whereby the roller is unlikely to move radially outward. Further, a plurality of tooth portions can have an axial thickness slightly smaller than the gap between a pair of inner links. The configurations described above allow an increase in the chain holding force without alternately differentiating the thickness of the tooth portions of the chain. Further, both a sprocket having an even total number of teeth and a sprocket having an odd total number of teeth can provide an increased chain holding force.

While only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. A bicycle sprocket engageable with a chain having rollers, the sprocket comprising:
   a body rotatable around a center rotational axis; and
   at least one tooth portion provided along a peripheral portion of the body, and having a front surface, a rear surface that faces away from the front surface in an axial direction of the center rotational axis, a drive side surface that connects the front and rear surfaces to each other in the axial direction on a downstream side with respect to a drive rotation direction, and a non-drive side surface that connects the front and rear surfaces to each other in the axial direction on an upstream side with respect to the drive rotation direction,
   the at least one tooth portion being configured such that one of the front and rear surfaces has a first chamfered portion that is formed in a radially outer portion of the at least one tooth portion and tapered radially outward in the axial direction, and
   the drive side surface has a first protrusion that protrudes downstream in the drive rotation direction and located radially outwardly from a contact position where the drive side surface comes into contact with each of the rollers when the chain is driven, a straight line that connects the contact position to the center rotational axis and a line tangential to the drive side surface in the contact position forming an angle greater than or equal to −7 degrees and smaller than or equal to 7 degrees.

2. The bicycle sprocket according to claim 1, wherein the first protrusion protrudes downstream in the drive rotation direction from the contact position, where the drive side surface comes into contact with each of the rollers when the chain is driven, by a first distance that is greater than or equal to 0.1 mm but smaller than or equal to 0.5 mm.

3. The bicycle sprocket according to claim 2, wherein the first distance is greater than or equal to 0.2 mm but smaller than or equal to 0.3 mm.

4. The bicycle sprocket according to claim 2, wherein the first distance is 0.2 mm.

5. The bicycle sprocket according to claim 1, wherein the non-drive side surface has a raised portion that is convex in a circumferential direction toward the upstream side with respect to the drive rotation direction, and the raised portion protrudes by an amount that is smaller than an amount that the first protrusion protrudes.

6. The bicycle sprocket according to claim 1, wherein the non-drive side surface has a second protrusion that protrudes in a circumferential direction.

7. The bicycle sprocket according to claim 1, wherein the tooth portion has a first tooth, a second tooth and a third tooth, the second tooth being adjacent the first tooth and upstream of the first tooth in the drive rotation direction, the third tooth being adjacent the second tooth and upstream of the second tooth in the drive rotation direction, and
a contact position where each of the rollers contacts the drive side surface of the first tooth when the chain is driven is spaced from a tip downstream position that is a position of a tip of the third tooth on a most downstream side with respect to the drive rotation direction by a second distance that is greater than or equal to 25.4 mm but smaller than or equal to 27 mm.

8. The bicycle sprocket according to claim 7, wherein the second distance is greater than or equal to 25.4 mm but smaller than or equal to 26.6 mm.

9. The bicycle sprocket according to claim 1, wherein the other one of the front surface and the rear surface has a second chamfered portion that is formed in a radially outer portion of the at least one tooth portion and tapered radially outward in the axial direction.

10. The bicycle sprocket according to claim 9, wherein the front surface has the first chamfered portion, and the rear surface has the second chamfered portion.

11. The bicycle sprocket according to claim 10, wherein a radial outer periphery end of the first chamfered portion is spaced from a radial inner periphery end of the first chamfered portion by a third distance in the axial direction, and a radial outer periphery end of the second chamfered portion is spaced from a radial inner periphery end of the second chamfered portion by a fourth distance in the axial direction, and the fourth distance is equal to the third distance.

12. The bicycle sprocket according to claim 10, wherein a radial outer periphery end of the first chamfered portion is spaced from a radial inner periphery end of the first chamfered portion by a third distance in the axial direction, and a radial outer periphery end of the second chamfered portion is spaced from a radial inner periphery end of the second chamfered portion by a fourth distance in the axial direction, and the fourth distance differs from the third distance.

13. The bicycle sprocket according to claim 12, wherein the third distance is greater than the fourth distance.

14. The bicycle sprocket according to claim 13, wherein the third distance is greater than or equal to 0.9 mm but smaller than or equal to 1.1 mm, and the fourth distance is greater than or equal to 0.6 mm but smaller than or equal to 0.9 mm.

15. The bicycle sprocket according to claim 1, wherein the tooth portion includes at least one group of a plurality of first teeth and at least one group of a plurality of second teeth, each of the first teeth having a first chain engagement thickness in the axial direction, each of the second teeth having a second chain engagement thickness in the axial direction, and the second chain engagement thickness is greater than the first chain engagement thickness, and the total number of teeth in the tooth portion is an even number.

16. The bicycle sprocket according to claim 15, wherein the first chain engagement thickness of each of the first teeth is a thickness that allows engagement with inner link plates of the chain but does not allow engagement with outer link plates, and the second chain engagement thickness of each of the second teeth is a thickness that allows engagement with outer link plates of the chain.

17. The bicycle sprocket according to claim 16, wherein each of the groups of the first teeth and each of the groups of the second teeth are alternately arranged in a circumferential direction.

18. The bicycle sprocket according to claim 1, wherein the tooth portion is formed of a stacked member including three layers stacked on each other in the axial direction.

19. The bicycle sprocket according to claim 18, wherein the stacked member includes a first member made of a first metallic material, a second member made of a second metallic material, and a third member disposed between the first member and the second member in the axial direction and made of a third metallic material, and a specific gravity of the third metallic material is smaller than a specific gravity of each of the first and second metallic materials.

20. The bicycle sprocket according to claim 19, wherein each of the first and second metallic materials is iron, and the third metallic material is aluminum.

21. The bicycle sprocket according to claim 18, wherein the stacked member includes a first member made of a first metallic material, a second member made of a second metallic material, and a third member disposed between the first member and the second member in the axial direction and made of a non-metallic material.

22. The bicycle sprocket according to claim 21, wherein the non-metallic material contains a resin.

23. The bicycle sprocket according to claim 1, wherein the angle is greater than or equal to −7 degrees and smaller than or equal to 3 degrees.

* * * * *